United States Patent

[11] 3,630,771

[72] Inventors Goro Akashi
Janagawa;
Yasuyuki Yamada; Masaaki Fujiyama,
both of Kanagawa, all of Japan

[21] Appl. No. 757,967
[22] Filed Sept. 6, 1968
[45] Patented Dec. 28, 1971
[73] Assignee Fuji Photo Film Co., Ltd.
Kanagawa, Japan
[32] Priority Sept. 8, 1967
[33] Japan
[31] 42/57639

[54] MAGNETIC RECORDING MEDIUM
4 Claims, 1 Drawing Fig.

[52] U.S. Cl. ........ 117/235, 252/62.54
[51] Int. Cl. ........ H01f 10/02
[50] Field of Search ........ 117/235; 252/62.54

[56] References Cited

UNITED STATES PATENTS

| | | | |
|---|---|---|---|
| 3,357,855 | 12/1967 | Bisschops et al. | 117/235 |
| 3,418,161 | 12/1968 | Bauer | 252/62.54 X |
| 3,437,510 | 4/1969 | Diaz | 252/62.54 X |

*Primary Examiner*—William D. Martin
*Assistant Examiner*—Bernard D. Pianalto
*Attorney*—Sughrue, Rothwell, Mion, Zinn & Macpeak

ABSTRACT: A magnetic recording medium wherein a magnetic recording layer is formed from a ferromagnetic powder dispersed in a binder applied onto a support, said binder being a polyether prepolymer having terminal —NCO radicals prepared from a polyisocyanate and a polyether glycol with a cellulose derivative having 7.5–40 percent of residual hydroxyl radicals in a weight ratio of from 1:2 to 20:1.

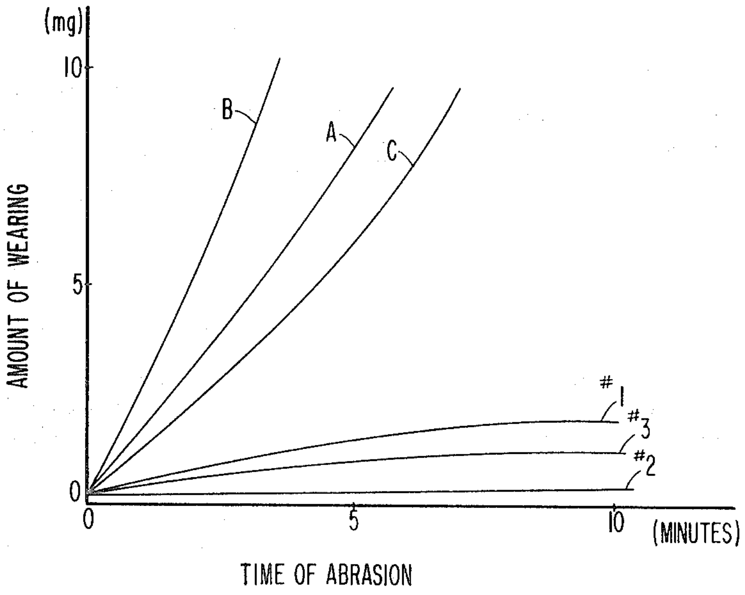
INVENTORS
GORO AKASHI
YASUYUKI YAMADA
MASAAKI FUJIYAMA
BY
Sughrue, Rothwell, Mion, Zinn & Macpeak
ATTORNEYS

MAGNETIC RECORDING MEDIUM

BACKGROUND OF THE INVENTION

1. Field of the Invention

This invention relates to a magnetic recording medium comprising a powder of a ferromagnetic material dispersed in a binder applied on a support, and especially to a magnetic recording medium having excellent antiabrasion properties and excellent surface properties.

2. Description of the Prior Art

Heretofore magnetic recording media have been produced by applying a ferromagnetic powder dispersed in a binder, such as polyvinyl chloride, polyvinyl acetate, copolymers of vinyl chloride and vinyl acetate polybutyl acrylate and polyamide resin to a film of a synthetic resin such as acetyl cellulose, polyvinyl chloride and polyethylene terephthalate. Epoxy resins, urea-formaldehyde resins, malamine-formaldehyde resins and polyurethane resins have also been used in order to improve antiabrasion properties.

SUMMARY OF THE INVENTION

According to this invention, there is provided a magnetic recording medium which comprises a magnetic recording layer composed of a ferromagnetic powder dispersed in a binder applied onto a support, said binder comprising a polyether prepolymer having terminal —NCO radicals prepared from polyisocyanate and polyether glycol, and cellulose derivatives having 7.5–40 percent residual or unsubstituted hydroxyl radical in a ratio by weight of from 1:2 to 20:1.

DETAILED DESCRIPTION OF THE INVENTION

As the polyether used for preparing prepolymer having isocyanate radical in both terminal ends, there may be mentioned (1) polyalkylene-ether glycol (for example, polytetraethylene ether glycol, polyethylene ether glycol and polypropylene ether glycol); (2) polyalkylene, arylene ether thioether glycol, (3) polyalkylene ether thioether glycol and (4) polyalkylene arylene ether glycol, etc. Suitable polyisocyanates include aromatic, aliphatic and alicyclic compounds, preferably 2,4-tolylene diisocyanate, m-phenylene diisocyanate, 4,4'-biphenylene diisocyanate 1,4-cyclohexylene diisocyanate, 1,5-tetrahydronaphthalene -diisocyanate, 1,6-hexamethylene diisocyanate, 4-chloro-1,3-phenylene diisocyanate and 1,5-naphthalene diisocyanate, etc. are employed.

The dispersibility of the magnetic powder in the magnetic recording medium of this invention is better than in the prior art medium using polyether prepolymer alone as a binder, since cellulose derivatives are admixed therewith. The surface properties and the sensitivity of the product of the present invention is excellent. Further anti-abrasion properties of the recording medium is better than that when nitrocellulose, acetyl butyryl cellulose or ethyl cellulose is used alone. Moreover, since the softening point of cellulose derivatives is high, its dispersibility with magnetic powders is excellent. Moreover, since the residual —OH radical in cellulose derivatives will react with the isocyanate radicals in the polyether prepolymer, the solvent resistance and heat resistance of the magnetic recording medium is considerably improved.

It is assumed that the residual hydroxyl radicals have some significant effect on the dispersibility of the magnetic material and the reactivity of polyether prepolymer with the isocyanate. According to many studies, it has been found that if the substitution ratio of hydroxyl radicals is too low, the antiabrasion property and the compatibility with polyurethane is decreased. In contradistinction, if the substitution ratio of the hydroxyl radical is too high, that is, the number of residual hydroxyl radicals is too low, the dispersibility of the magnetic material and the cost of the magnetic recording medium increases. It is therefore considered to be necessary to have more than 7.5 percent and less than 40 percent residual hydroxyl radical in view of said facts.

Concerning the mixing ratio of these cellulose derivatives and prepolymers, if the amount of cellulose is too high, the antiabrasion property is decreased, and if it is too low, the dispersibility of the magnetic particles is decreased and surface of the medium becomes too rough. Accordingly, it has been ascertained that the preferable ratio by weight is 2:1–1:20.

Suitable prepolymers of polyurethane resin, include the polyether-type prepolymers which are employed in this invention and polyester-type prepolymers. When the actual characteristics of the magnetic recording medium (tape) employing these two types of resins is compared, it is found that the polyether-type prepolymer is clearly superior as a binder for the magnetic recording tape.

(1) When the head of the video tape recorder is pushed strongly, the durability of the tape using the polyether prepolymer is six to seven times of that of the polyester prepolymer.

(2) The tape using the polyether prepolymer shows +1 –+2.0 db. range higher in point of S/N than the polyester prepolymer.

Thus the magnetic recorder has excellent characteristics in antiabrasion properties and surface properties as compared with the binders used in the prior art. Suitable magnetic powders used in this invention include γ-$Fe_2O_3$, Fe–Co–Ni alloy, $CrO_2$ in addition to cobalt including $Fe_2O_3$, $Fe_3O_4$, Ba-ferrite, etc.

This invention will now be further explained in more detail by reference to several specific examples:

EXAMPLE 1

The following ingredients were admixed in a ball mill.

(ratio of mixture is represented by parts by weight)

| | |
|---|---|
| γ-$Fe_2O_3$ finely divided powder | 300 parts |
| Carbon black | 13 parts |
| Nitrocellulose (30 percent redisual hydroxyl radical) | 20 parts |
| Lecithin | 3 parts |
| Fluorine oil | 5 parts |
| Butyl acetate | 550 parts |

Into the prepared dispersion, a mixture of 50 parts of prepolymer (trade name: "TAKENATE XL–1007," made by Takeda Chemical Industries Co., Ltd. a polyether polyol prepolymer having an NCO content of 4.42–4.67 percent, a viscosity of 210,000–230,000 cp. an amine equivalency of 910–950 and a freezing point of −10° C.) 4.5 parts of 4,4'-methylene bis-(2 chloroaniline) and 100 parts of butyl acetate was added. The resulted liquid mixture was applied to a polyethylene terephthalate film having 25μ thickness applied under coating of amorphous polyester to form a layer having 10μ thickness. The film was then dried. Thus resulted film was cut in tape form to produce Sample No. 1.

EXAMPLE 2

The following ingredients were admixed in a ball mill.

| | |
|---|---|
| γ-$Fe_2O_3$ finely divided powder | 300 parts |
| Acetyl butyryl cellulose (18 percent residual Hydroxyl radical) | 40 parts |
| Lecithin | 3 parts |
| Cationic surface-active agent | 10 parts |
| Fluorine oil | 5 parts |
| Butyl acetate | 600 parts |

Into the prepared dispersion, a mixture of 65 parts of prepolymer ("TAKENATE XL–1007"), 4.5 parts of 4,4'-methylene-bis-(2-chloroaniline) and 100 parts of butyl acetate was added. The mixture was applied to a polyethylene terephthalate film having 25μ thickness applied under coating to form a layer having 10μ dried thickness. The magnetic recorder of this example is called Sample No. 2.

EXAMPLE 3

The following ingredients were mixed by a ball mill.

| | |
|---|---|
| $Fe_3O_4$ powder | 300 parts |
| Ethyl cellulose (30 percent residual hydroxyl radical | 35 parts |
| Lecithin | 3 parts |
| Oleic acid | 8 parts |
| Silicone oil | 1 part |
| Butyl acetate | 400 parts |

Into the prepared dispersion, a mixture of 65 parts of TAKENATE XL–1003, 15 parts of 4,4′-methylene-bis-(2-chloroaniline) and 100 parts of butyl acetate was added, then Sample No. 3 was produced by the same procedure as in said two examples.

Moreover, magnetic recorders of the prior art as comparative samples were produced with employing the following resins as the binders.

Comparison sample A

Vinyl chloride-vinyl acetate (88:12) copolymer.

Comparison sample B

Nitrocellulose (12 percent of residual hydroxyl radical).

Comparison sample C

Nitrocellulose and polyester prepolymer.

These samples were laid on a rotating disk and fixed thereto. The antiabrasion properties of these examples were examined by pressing under a definite load in contact with a sham magnetic head and rotating said rotating disk.

The drawing is a graph of the antiabrasion properties of magnetic recorders produced in examples 1, 2 and 3 and the Comparison examples. The abscissa is in terms of time in minutes of abrasion for wear and the ordinate is in terms of amount of wear of each sample tape (mg.).

As is shown by the figure, it takes about 10–20 minutes or more to wear down the magnetic recording tapes according to this invention, in comparison with 1–2 minutes in the sample tapes of the comparison examples which show the prior art tapes. Accordingly, the evenness and abrasion resistance of the magnetic layer of this magnetic recording tape is improved at least 10 times of the prior art. By this fact, which shows ratio of durable time, it will be readily understood that the effect of this invention is excellent in practical application.

What is claimed is:

1. A magnetic recording medium which comprises a support and a magnetic layer comprising a magnetic powder dispersed in a binder, said binder comprising the reaction product of a prepolymer having terminal isocyanate radicals and a cellulose derivative containing from 7.5–40 percent of residual hydroxyl radicals in a ratio by weight of from 1:2 to 20:1, said prepolymer being the reaction product of a polyether glycol and a polyisocyanate and said cellulose derivative being selected from the group consisting of nitrocellulose, acetyl butyryl cellulose and ethyl cellulose.

2. The recording medium of claim 1 wherein said cellulose derivative is nitrocellulose.

3. The recording medium of claim 1 wherein said cellulose derivative is acetyl butyryl cellulose.

4. The recording medium of claim 1 wherein said polyether in said prepolymer is selected from the group consisting of polyalkylene ether glycol, polyalkylene ether thio glycol, polyarylene ether thio glycol, polyalkylene arylene ether glycol.

* * * * *